May 23, 1961
G. H. MOREY
2,985,860
ELECTRIC HEATING TAPE AND METHOD OF MANUFACTURE
Filed Dec. 7, 1959
2 Sheets-Sheet 1
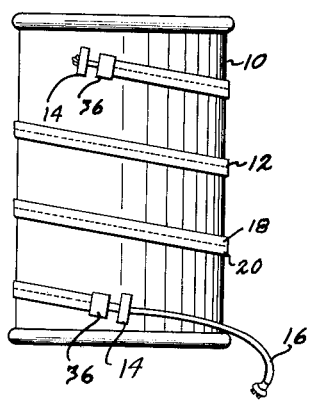
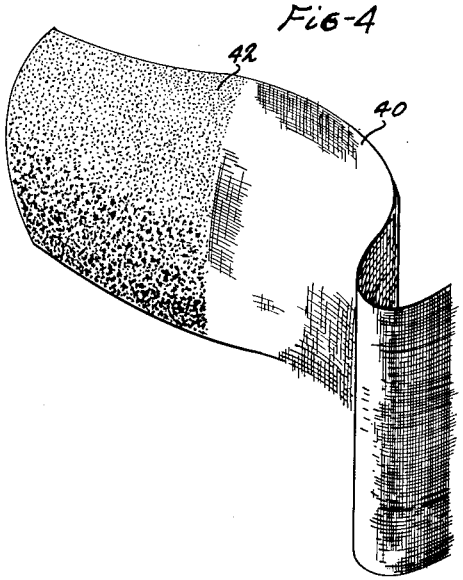
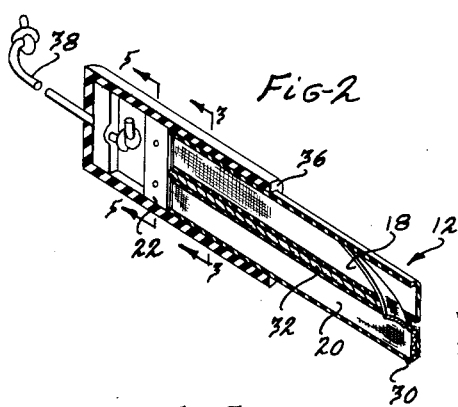
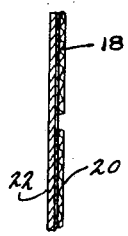
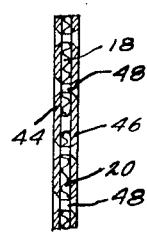
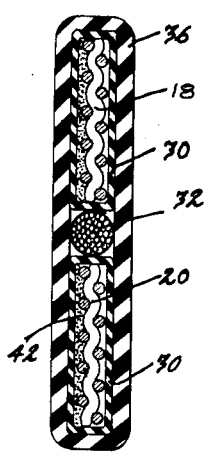
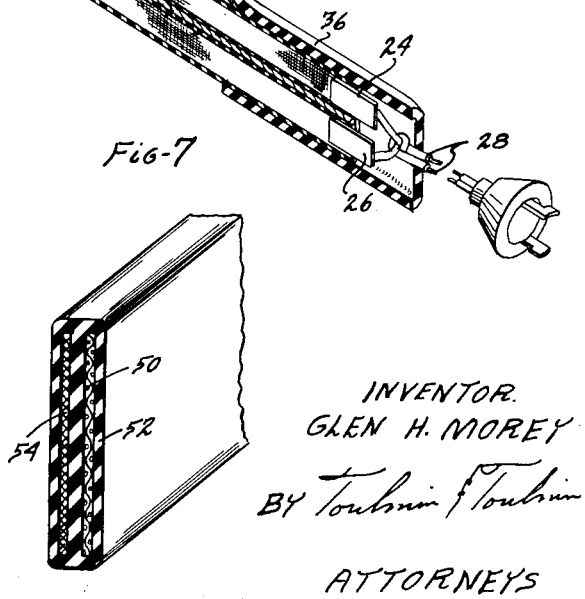
INVENTOR.
GLEN H. MOREY
BY Toulmin & Toulmin
ATTORNEYS May 23, 1961 G. H. MOREY 2,985,860
ELECTRIC HEATING TAPE AND METHOD OF MANUFACTURE
Filed Dec. 7, 1959 2 Sheets-Sheet 2
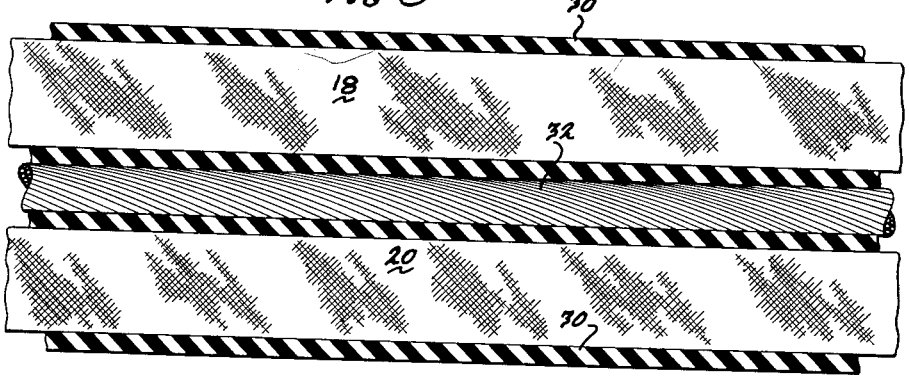
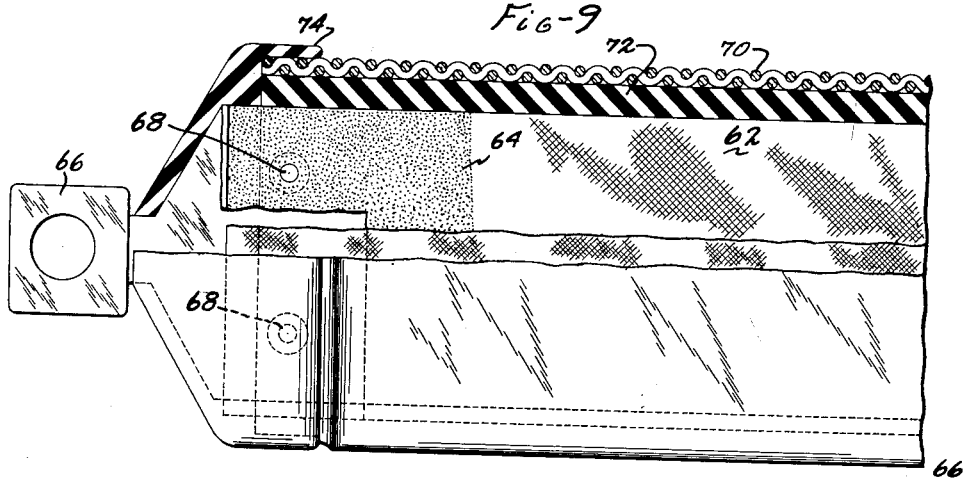
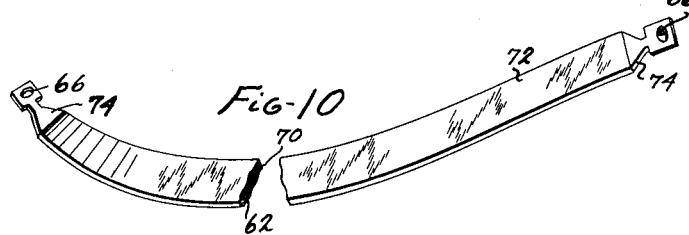
INVENTOR.
GLEN H. MOREY
BY
ATTORNEYS United States Patent Office 2,985,860
Patented May 23, 1961

2,985,860

ELECTRIC HEATING TAPE AND METHOD OF MANUFACTURE

Glen H. Morey, Terre Haute, Ind., assignor, by mesne assignments, to Templeton Coal Company, Inc., Terre Haute, Ind., a corporation of Indiana Filed Dec. 7, 1959, Ser. No. 857,701

11 Claims. (Cl. 338—208)

This invention relates to electric resistance heating tapes and is particularly concerned with a novel electric resistance heating tape utilizing a fabric heating element and to a method of making such a tape.

Resistance electric heating tapes are well known and generally take the form of a relatively fine wire resistance element which is disposed in a tape either in zig-zag fashion side by side, or running back and forth from end to end thereof. In any case heating tapes of this nature are extremely delicate on account of the fine wires therein which easily become broken or damaged due to abuse of the tape and heating tapes of this nature, furthermore, have definite limitations with respect to the amount of power that can be converted into heat and the amount of heat that can be transmitted to a surface to be heated. Accordingly, electric resistance heating tapes have heretofore been fairly short and have fairly small power ratings and the use thereof has been somewhat limited.

In my co-pending applications Serial No. 752,812, filed August 4, 1958, now Patent No. 2,952,001, and entitled "Electrical Heating Tape and Method of Making," and in my application Serial No. 806,020, filed April 13, 1959, and entitled "Flexible Heating Tape," I show various arrangements wherein I utilize, as a resistance heating element, a relatively thin, flat, wide ribbon of metal through which the electric current passes.

Such a ribbon-like resistance heating element has a number of advantages among which are its inherent ruggedness and resistance to abuse while still retaining a high degree of flexibility and substantial elimination of power and size limitations.

Ribbon-like resistance heating elements of this nature can be made quite wide and quite long and can convert large amounts of electric power into heat. Also, ribbon-like resistance heating elements of this nature can convert a great deal of power into heat while still operating at a substantially lower temperature than a heating tape having a wire resistance heating element therein. The ribbon-like heating element can also be operated at high temperatures and in which case a great deal more power is converted into heat than is possible with heating tapes having wire elements therein.

In my experimental and investigative work in connection with electric resistance heating tapes having ribbon-like elements therein, I have discovered that a unique tape having desirable characteristics can be constructed utilizing a graphite fabric as the resistance element. With this in mind, a primary object of the present invention is the provision of a greatly improved electric resistance heating tape in which the heating element is in the form of a graphite fabric.

Still another object of this invention is the provision of a flexible electric resistance heating tape in which the heating element is in the form of graphite fabric.

It is also an object of this invention to provide an electric resistance heating tape of extremely high flexibility thereby adapting it for use in circumstances where even the most flexible tape having metal wire or metal ribbon heating elements therein could not be applied.

Still another object of this invention is the provision of an electric resistance heating tape having a graphite fabric heating element therein in which tape is so constructed that the tape can be used in the normal manner without there being any danger of the fabric heating element becoming torn or damaged.

These and other objects and advantages of this invention will become more apparent upon reference to the following specification taken in connection with the accompanying drawings in which:

Figure 1 is an elevational view showing a resistance heating tape according to my invention wrapped about a member, for example, a steel drum for heating the drum;

Figure 2 is a perspective view drawn in section partly and broken away showing the construction of the heating tape of Figure 1;

Figure 3 is a sectional view through the tape indicated by line 3—3 on Figure 2;

Figure 4 is a perspective view drawn at enlarged scale showing a portion of the graphite fabric forming the resistance heating element and showing how the end thereof is metallized for receiving a terminal;

Figure 5 is a sectional view indicated by line 5—5 on Figure 2 showing one manner of connecting the two reaches of the resistance heating element together;

Figure 6 is a view like Figure 5 but showing another manner of connecting the two reaches of the heating element together;

Figure 7 is a fragmentary perspective sectional view showing the manner in which a heating tape according to this invention having a single ribbon of the heating element therein can be reinforced by an added tape member so as to prevent the heating element from becoming torn or damaged;

Figure 8 is a fragmentary longitudinal sectional view through the tape of Figure 2 showing more particularly the construction thereof;

Figure 9 is a fragmentary view showing one end of a resistance heating tape in which the fabric heating element according to this invention has a fabric or textile sheath therearound and which sheath is enclosed in a rubber-like coating; and Figure 10 is a perspective view showing the appearance of a completed tape according to the Figure 9 construction.

Referring to the drawings somewhat more in detail, Figure 1 shows a typical application of a flexible resistance heating tape according to my invention. In Figure 1 a drum 10 has wrapped thereabout a tape 12 according to this invention and which may be anchored in place by the magnets 14. A cable 16 provides for a supply of electric current to the heating tape. The example illustrated is only one of many applications that can be made of a flexible heating tape of the nature with which this invention is concerned.

The construction of one form of the tape is illustrated in Figure 2 where it will be seen that the tape comprises two lengths of resistance heating elements 18 and 20 which at the one end are interconnected by a connector 22 while on the other end connectors 24 and 26 are provided which are attached to the wires 28 which carry a plug or other connector by means of which electric current can be supplied to the resistance heating element.

Each of the individual heating elements 18 and 20, in Figure 2 are enclosed in a plastic sheath 30 and which sheath is resistant to temperatures up to a relatively high degree. Such a plastic material might, for example be silicone rubber of which there are known mixtures that can be heated up to 500° F. or more.

The two plastic clad resistance heating elements 18 and 20 are arranged in side by side relation with a cord 32 extending along in the space therebetween. This cord serves to strengthen the resultant structure and to hold the individual heating elements in spaced relation.

Each end of the heating tape is provided with a rubber-like member 36 which encloses and seals the pertaining end of the tape. The one rubber-like member 36 has a cord 38 attached thereto by means of which the tape can be connected to an object to be heated thereby, and the other of the members 36 is provided with an aperture through which wires 28 extend. The members 36 may be cemented to the ends of the plastic sheet surrounding the individual heating element.

A particularly novel feature of the arrangement of the present invention is in the nature of the heating elements 18 and 20. These heating elements are in the form of pure graphite fabric as is illustrated in Figure 4. This fabric is formed of threads woven so that the product resembles a conventional, somewhat loosely, woven textile material. The fibers however, are pure graphite so that, as a result, this product has electrical resistance and conductivity and will become heated when an electric current is passed therethrough. Since the material is graphite, it can be raised to a high temperature without deterioration and, particularly where the heating elements are enclosed, as in a plastic material, or otherwise protected from the surrounding atmosphere, the heating of the heating element does not tend to introduce any deterioration. Such deterioration occurs, for example, where the element is heated to relatively high temperature in open air.

In order to provide the ends of the heating element with connectors or the like, the ends of the strip of fabric, as indicated at 40 in Figure 4, may be provided with a metallized area 42. Such a metallized area is preferably a highly conductive material such as copper or silver or the like and may be sprayed on the fabric, or may be placed thereon in a powdered condition and sintered in place, or the material may be plated on the fabric by either a wet plating or a gas plating process.

Also, the ends of the heating element could be clamped between conductive elements such as hard graphite to effect electrical connection therewith.

In the case where there are regions at the end of each heating element that are metallized as indicated in Figure 4, there is formed not only a physically strong reinforcement for the fabric but this also provides for electrical connection with the electric heating element in such a manner that there are no hot spots developed and, instead, the electric current is delivered to the heating element substantially uniformly across its entire width.

The connector 22, referred to in connection with Figure 2, is shown more in detail in Figure 5. This connector is connected to the ends of the heating elements 18 and 20 as by soldering, brazing, or the like, or it may be attached thereto by other fastener means. Where it is desired to use rivets, as in Figure 6, the heating elements 18 and 20 have the bars 44 and 46 which may be metal or hard graphite arranged on opposite sides thereof with the screws or rivets or the like 48 clamping the bars on the opposite faces of the end of the fabric which may also be metallized.

In the Figure 6 structure it would probably be preferable, although not necessary, to metallize both faces of the fabric.

The modification illustrated in Figures 2 through 4 is one in which there are two heating elements interconnected at one end and having two wires leading from the other end for the supply of electric current thereto.

It is also possible to make heating tapes with only a single length of resistance heating element therein, however, and such an arrangement is illustrated in Figure 7.

In Figure 7 the resistance heating element indicated at 50 is of the same nature as that of the first modification, namely, a graphite fabric and is enclosed with a plastic sheath 52 applied directly thereto which may be silicone rubber or the like. In order to be resistant to stretching, the heating tape may have imbedded in the plastic coating 52, a tape 54 which is resistant to stretching by being made for example, of a glass fiber fabric which is highly flexible.

Figure 8 also illustrates at a somewhat larger scale the construction of the tape of Figures 1 through 4.

The structure of Figure 9 is a tape similar to what has been described previously where there is a graphite resistance heating element 62 having metallized end portions 64. A connector 66 is provided with a slot to receive a metallized end 64 of the tape and the connector may be joined to the tape as by soldering or rivets 68.

The heating element in Figure 9 is enclosed by textile sheath 70, which may be of quartz or asbestos or glass fibers, and this sheath is preferably mounted over a rubber-like material, such as silicone rubber 72 forming an inner moisture proof sheath. The textile sheath may be coated or impregnated with the rubber-like material if desired. End members 74 may be cemented to the ends of the sheath and thus support the tape against stretching and also seals the ends against moisture. This is the preferred construction because of the protection offered to the heating element.

The heating element has been disclosed and described as consisting of a fabric in which the threads or yarns are formed or graphite fibers. It will be appreciated, however, that it would be possible to form such a heating element in which the threads or yarns running in one direction were formed of graphite fibers and those running in the other direction were formed of non-conductive material such as asbestos, quartz or glass. Furthermore, at least some of the threads or yarns in the first mentioned direction might be formed of non-conductive material and which would have the advantage of adding strength against breakage to the heating element.

Where the conductive threads or yarns run in one direction only, this would also be the direction of flow of electric current through the tape or heating element. Where the entire fabric is made of graphite fibers, the direction of current flow is not predetermined and the connectors can be attached to fabrics in any region. Furthermore, such a heating element can be of any size or shape without affecting the operability thereof.

For forming relatively narrow heating elements according to this invention and particularly where the weft or fill threads are of a non-conductive nature, a device in the nature of a ribbon loom could advantageously be employed, and this would eliminate raw edges at the sides of the heating element as would occur if the heating element were cut out from a larger piece of fabric.

It will be understood that this invention is susceptible to modification in order to adopt it to different usages and conditions; and, accordingly, it is desired to comprehend such modifications within this invention as may fall within the scope of the appended claims.

I claim:

1. An electric heating device comprising a fabric heating element having threads made up entirely of graphite, air excluding electric insulating means enclosing said heating element, and connectors attached to spaced points of the heating element and projecting through said insulating means for the supply of electric power to said heating element.

2. An electric heating tape comprising; a strip of fabric having threads made up entirely of graphite and having end portions, air excluding electrical insulating material sheathing said strip, metal connectors attached to the said end portions of the strip for the supply of electrical energy thereto and projecting through the ends of said sheath and a flexible element resistant to extension fixed to said sheath and co-extensive with said strip to reinforce said strip.

3. An electric heating tape comprising; a strip of fabric having threads made up entirely of graphite and having metallized ends, rubber-like insulating material forming an air excluding sheath about said strip, metal connectors attached to said metallized ends and extending from the sheath for the supply of electrical energy to said strip, and a flexible substantially inextensible sleeve of textile material surrounding said sheath to reinforce said strip against breakage and abrasion.

4. An electric heating tape comprising; a strip of fabric having threads made up entirely of graphite and having metallized ends, rubber-like insulating material forming a closely fitting air excluding sheath about said strip, metal connectors attached to said metallized ends and extending from the sheath for the supply of electrical energy to said strip, and an outer sheath of textile material surrounding said rubber-like material.

5. An electric heating tape comprising; a strip of fabric having threads made up entirely of graphite and having metallized ends, rubber-like insulating material forming an air excluding sheath about said strip, means attached to said metallized ends and extending sealingly from the sheath for the supply of electrical energy to said strip, and an outer sheath of textile material closely surrounding said rubber-like material.

6. An electric heating tape comprising two strips of fabric each having threads made up entirely of graphite and arranged in side by side relation, means electrically connecting the strips at one end, means for effecting individual electrical connection with said strips at the other end, individual sheaths of air excluding electrical insulating material surrounding said strips, and means interconnecting said sheath to form a unitary tape.

7. As a new article of manufacture; a woven fabric adapted for use as an electric heating element, said fabric having threads at least some of which are entirely of graphite running in the direction of current flow through the heating element and other threads at right angles thereto.

8. A method of making a resistance heating element which comprises; forming a fabric from threads or yarns including at least some of which are made entirely of graphite fibers, and attaching electric conductors to spaced points of the thus formed fabric.

9. A method of making a resistance heating element which comprises; forming a fabric from threads or yarns including at least some which are made entirely of graphite fibers, metallizing spaced regions of the thus formed fabric, and attaching electric conductors to said regions.

10. A method of making a flexible electric resistant heating element which comprises; forming a strip of fabric in which at least some of the threads or yarns running longitudinally thereof are entirely graphite, metallizing the opposite ends of said strip, attaching electric conductors to said metallized ends, and sealing the surface of the strip from access to the atmosphere.

11. A method of making flexible electric resistant heating element which comprises; forming a strip of fabric in which at least some of the threads or yarns running longitudinally thereof are entirely graphite, metallizing the opposite ends of said strip, attaching electric conductors to said metallized ends, and simultaneously electrically insulating and sealing the surface of the strip from access to the atmosphere.

References Cited in the file of this patent
UNITED STATES PATENTS

| | | |
|---|---|---|
| 1,384,467 | Homan | July 12, 1921 |
| 2,341,219 | Jones | Feb. 8, 1944 |
| 2,559,077 | Johnson et al. | July 3, 1951 |
| 2,584,302 | Stein et al. | Feb. 5, 1952 |
| 2,610,286 | Cox | Sept. 9, 1952 |
| 2,617,011 | MacKendrick | Nov. 4, 1952 |